US008682819B2

(12) United States Patent
Consul et al.

(10) Patent No.: US 8,682,819 B2
(45) Date of Patent: Mar. 25, 2014

(54) MACHINE-BASED LEARNING FOR AUTOMATICALLY CATEGORIZING DATA ON PER-USER BASIS

(75) Inventors: Ashish Consul, Redmond, WA (US); Harvey Rook, Newcastle, WA (US); Rajasi Saha, Sammamish, WA (US); Shengquan Yan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 951 days.

(21) Appl. No.: 12/142,747

(22) Filed: Jun. 19, 2008

(65) Prior Publication Data
US 2009/0319456 A1    Dec. 24, 2009

(51) Int. Cl.
*G06F 15/18* (2006.01)

(52) U.S. Cl.
USPC ............................................. 706/20; 706/21

(58) Field of Classification Search
None
See application file for complete search history.

(56) References Cited

U.S. PATENT DOCUMENTS

| | | | |
|---|---|---|---|
| 6,519,575 B1 * | 2/2003 | Goebel | 706/20 |
| 6,697,998 B1 | 2/2004 | Damerau et al. | |
| 6,718,367 B1 * | 4/2004 | Ayyadurai | 709/206 |
| 6,823,323 B2 * | 11/2004 | Forman et al. | 706/20 |
| 7,055,094 B2 | 5/2006 | Imielinski et al. | |
| 7,249,116 B2 | 7/2007 | Fiske | |
| 7,587,101 B1 * | 9/2009 | Bourdev | 382/291 |
| 7,660,775 B2 * | 2/2010 | Bougaev et al. | 706/20 |
| 7,707,162 B2 * | 4/2010 | Naphade et al. | 707/999.103 |
| 2001/0042087 A1 * | 11/2001 | Kephart et al. | 707/530 |
| 2002/0173971 A1 * | 11/2002 | Stirpe et al. | 705/1 |
| 2003/0069892 A1 * | 4/2003 | Hind et al. | 707/103 X |
| 2004/0123233 A1 * | 6/2004 | Cleary et al. | 715/513 |
| 2004/0220892 A1 * | 11/2004 | Cohen et al. | 706/20 |
| 2005/0108200 A1 * | 5/2005 | Meik et al. | 707/3 |
| 2005/0165895 A1 * | 7/2005 | Rajan et al. | 709/206 |
| 2005/0182736 A1 | 8/2005 | Castellanos | |
| 2005/0204001 A1 | 9/2005 | Stein et al. | |
| 2006/0036696 A1 * | 2/2006 | Maresh | 709/206 |
| 2006/0095521 A1 | 5/2006 | Patinkin | |
| 2006/0200434 A1 * | 9/2006 | Flinn et al. | 706/12 |
| 2007/0028171 A1 * | 2/2007 | MacLaurin | 715/705 |
| 2007/0043742 A1 * | 2/2007 | Arguello et al. | 707/100 |
| 2007/0078832 A1 * | 4/2007 | Ott et al. | 707/3 |
| 2007/0143284 A1 | 6/2007 | Lee et al. | |

(Continued)

OTHER PUBLICATIONS

"Ontology (information science)," Wikipedia entry, screenshot provided. Available at: en.wikipedia.org/wiki/Ontology_(information_science). Last visited: Oct. 15, 2011.*

(Continued)

*Primary Examiner* — Daniel Kinsaul

(57) ABSTRACT

Architecture that employs machine-based learning to automatically categorize data on a per-user basis. Auto-tagging reduces the burden on infoworkers by creating a machine learning model to learn from user tagging behavior or preferences. Once this information is obtained, a trained model for this specific user is used to assign tags to incoming data, such as emails. The architecture finds particular applicability to compliance and message retention policies that otherwise would mandate extra work for the infoworker. The architecture learns the tagging behavior of a user and uses this learned behavior to automatically tag data based on the user's prior tagging habits. A regression algorithm is employed to process the training data according to an n-dimensional framework for prediction and application of the tag(s) to the incoming messages.

19 Claims, 16 Drawing Sheets

(56) References Cited

U.S. PATENT DOCUMENTS

| | | | |
|---|---|---|---|
| 2007/0143298 A1* | 6/2007 | Surendran et al. | 707/10 |
| 2007/0179945 A1* | 8/2007 | Marston et al. | 707/5 |
| 2007/0185858 A1* | 8/2007 | Lu et al. | 707/5 |
| 2007/0239638 A1* | 10/2007 | Zhuang et al. | 706/20 |
| 2008/0040362 A1 | 2/2008 | Aucouturier et al. | |
| 2008/0082466 A1* | 4/2008 | Meijer et al. | 706/12 |
| 2008/0086458 A1* | 4/2008 | Robinson et al. | 707/3 |
| 2008/0104032 A1* | 5/2008 | Sarkar | 707/3 |
| 2008/0112625 A1* | 5/2008 | Cooper | 382/228 |
| 2008/0147818 A1* | 6/2008 | Sabo | 709/206 |
| 2008/0282198 A1* | 11/2008 | Brooks et al. | 715/854 |
| 2009/0077124 A1* | 3/2009 | Spivack et al. | 707/103 Y |
| 2009/0119370 A1* | 5/2009 | Stern et al. | 709/206 |

OTHER PUBLICATIONS

"What is an Ontology," Stanford article, screenshot provided. Available at www-ksl.stanford.edu/kst/what-is-an-ontology.html. Last visited: Oct. 15, 2011.*

"Plurality: A Context-Aware Personalized Tagging System," by Graham et al. In: Proc. of the 17th Int'l Conf. on WWW (Apr. 21-25, 2008). Available at: ACM.*

"Learning to Classify E-mail," by Koprinska et al. In: Information Sciences, vol. 177, Is. 10, pp. 2167-2187 (May 15, 2007). Available at: ScienceDirect.*

"Automatically Classifying Emails into Activities," by Dredze et al. In: Proc. 11th Int'l Conf. on Intelligent User Interfaces, pp. 70-77 (2006). Available at: ACM.*

"Email Classification with Co-Training," by Kiritchenko & Matwin. In: Proc. 2001 Conf. Centre for Advanced Studies on Collaborative Research (2001). Available at: ACM.*

"BuzzTrack: Topic Detection and Tracking in Email," by Cselle et al. In: Proc. 12th Int'l Conf. on Intelligent User Interfaces pp. 190-197 (2007). Available at: ACM.*

Eck, et al., "Autotagging Music Using Supervised Machine Learning", 2007, Austrian Computer Society (OCG).

"Microsoft Center for Information Work Empowering People and Business Through the Power of Software", May 2006.

Datta, et al., "Tagging over Time: Real-world Image Annotation by Lightweight Meta-learning", Proceedings of the ACM Multimedia Conference, Sep. 2007, ACM.

* cited by examiner

MACHINE-BASED LEARNING FOR AUTOMATICALLY CATEGORIZING DATA ON PER-USER BASIS

BACKGROUND

Companies and users are being deluged with vast amounts of data on a daily basis, some data that is to be saved and some that is to be deleted. In either case, the ability to decide which data to keep and which to delete is a daily and endless process that can consume an inordinate amount of time and effort not only for the company but also for the user. This becomes particularly important with dealing with data retention policies, especially for legal matters. However, the categorization of data remains a cumbersome and tedious prospect, especially for users.

Data can be organized by tagging or filing into folders. Increasingly, the trend is to tag data for easy categorization. One specific application of data tagging is in the area of messages such as email. Tagging can be an approach for infoworkers to organize incoming email. Each tag can have a different retention policy assigned by an administrator. By tagging an email the infoworker tells the system how and when the email should be reclaimed or recycled. Compared to the managed folder approach, tagging does not interrupt the workflow of the infoworker, and therefore, alleviates the pain of dragging email messages to specific folders.

Although infoworkers can use rules and default tags to automatically assign tags to incoming email, the amount of email that requires user intervention is still a pain for infoworkers with high incoming mail flow. Moreover, each user follows unique patterns for tagging data thereby reducing the reliability of providing properly tagged data, if tagged at all.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture employs machine-based learning to automatically categorize data (e.g., messages) on a per-user basis. Auto-tagging is designed to reduce this burden from infoworkers as much as possible. With the auto-tagging approach, the system creates a machine learning model to learn from user tagging behavior or preferences. Once this information is obtained, a trained model for this specific user is used to assign tags to incoming emails, for example. As long as the model has high prediction accuracy, the number of emails that require user intervention can be limited to a small and manageable number. The basic workflow of the auto-tagging architecture is, an infoworker tags the existing mails, the learning model reads the tagged email and trains the model, and the model predicts tags for incoming emails.

To the accomplishment of the foregoing and related ends, certain illustrative aspects are described herein in connection with the following description and the annexed drawings. These aspects are indicative of the various ways in which the principles disclosed herein can be practiced, all aspects and equivalents of which are intended to be within the scope of the claimed subject matter. Other advantages and novel features will become apparent from the following detailed description when considered in conjunction with the drawings.

DETAILED DESCRIPTION

Figure 1:
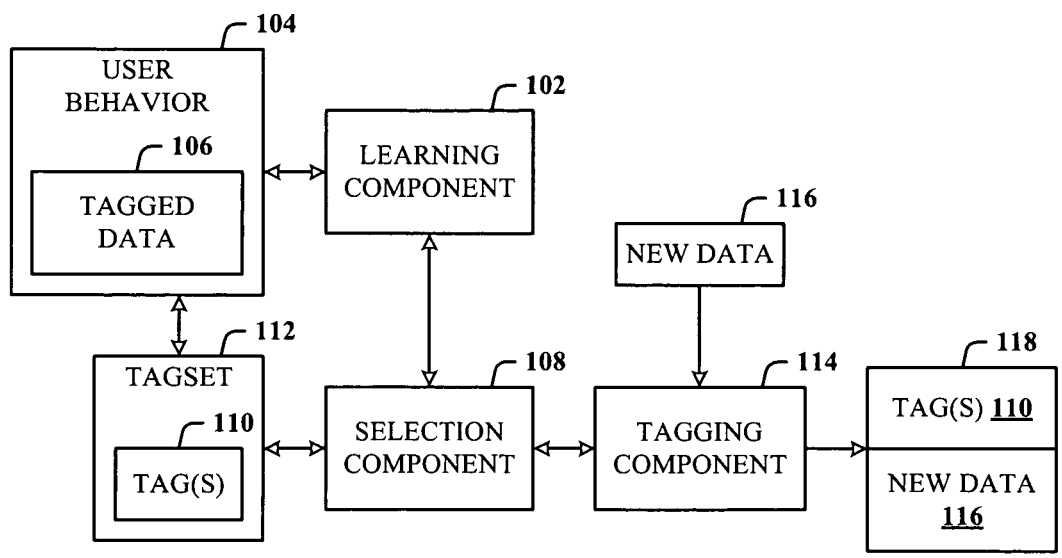
FIG. 1 illustrates an exemplary computer-implemented tagging system in accordance with the disclosed architecture.

Compliance and message retention policies mandate extra work for the infoworker. In the compliance world, auto-tagging is effective for dealing with compliance issues. Auto-tagging relieves the burden on the infoworker for categorizing data for retention. This means greater incentive for the infoworker to comply with company regulations and policies and eventually results in improved compliance for an organization. The disclosed architecture learns the tagging behavior of a user and uses this learned behavior to automatically tag data based on the user's prior tagging habits. A net benefit is a huge savings in time and an improved user experience such that the user is no longer overly-burdened with interacting with the data each time the data arrives.

The architecture is mechanism for learning the infoworker's tagging behavior by employing a form of a conjugate gradient logistic regression algorithm to learn per-user tagging behavior and then predicting and applying tags to data (e.g., incoming messages) in the system. The algorithm is generic and can be leveraged for tagging documents such as email messages and other forms of electronic data. The architecture predicts and applies tags just-in-time based on machine learning as new data/e-mail entering the system.

Automatically selected tags are applied just-in-time as a new message, for example, comes into the system.

The architecture facilitates dynamic re-learning of user tagging behavior for improved accuracy of the predicted retention tags. Moreover, models can be scoped to specific sets of user data and to the user, in general, such as a user mailbox, for example. Hence, predictions are personalized based on that specific user data (e.g., user mailbox). The model for tagging user data can also be obtained from an organization-based set of tagged data. This allows the obtainment of a critical mass of training data more easily, even though the organization-based data is less personalized for a given user.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates an exemplary computer-implemented tagging system 100 in accordance with the disclosed architecture. The system 100 includes a learning component 102 for learning user behavior 104 related to tagged data 106. The system 100 can further comprise a selection component 108 for selecting one or more tags 110 from a tagset 112 based on the learned user behavior 104, and a tagging component 114 for automatically tagging new data 116 with the one or more tags 110 based on the learned user behavior 104, resulting in newly-tagged data 118 (which includes the tag(s) 110 and the new data 116).

The tagged data 106 can be a subset obtained from a large pool of data of the user from which models can be created and employed for future automated tagging actions. For example, in the context of applying the system 100 to email messages or other types of messages, the tagged data 106 can be a predefined minimum number (e.g., 500) of data items (e.g., email messages) that provides a good sample from which a reliable user behavior model can be developed.

The tagset 112 can be multiple different tags configured by an enterprise administrator for use in tagging data. Thus, the system 100 has particular applicability for data retention and compliance requirements such as for messages (e.g., email) and other documents (e.g., word processing, spreadsheets, etc.).

Figure 2:
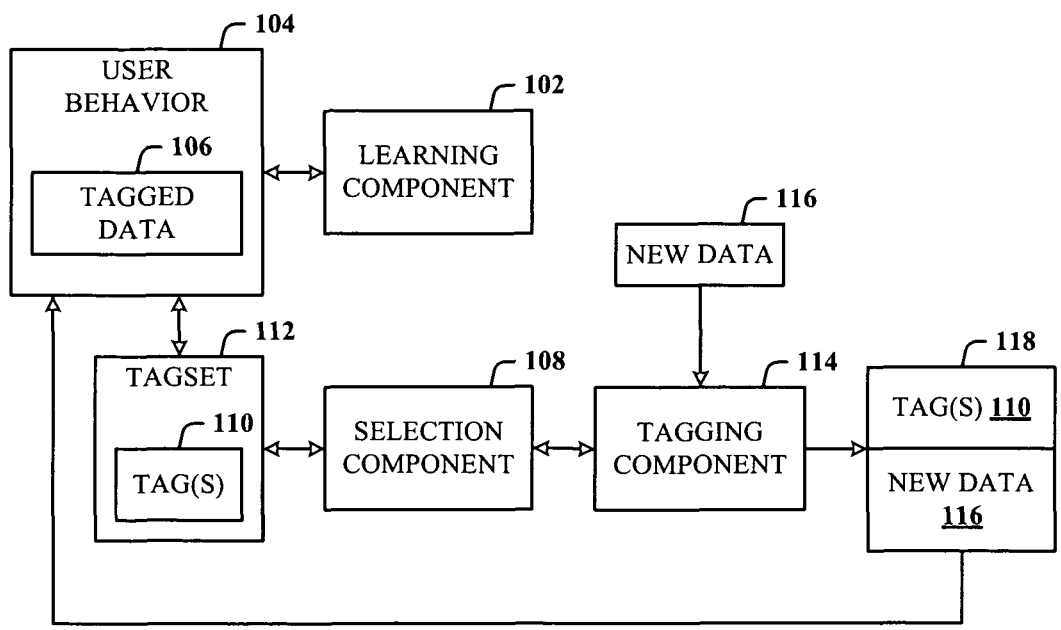
FIG. 2 illustrates an exemplary learning and tagging system where newly-tagged data is now included in the tagged data for updated training of the learning component.

FIG. 2 illustrates an exemplary learning and tagging system 200 where newly-tagged data is now included in the tagged data for updated training of the learning component 102. The system 200 includes the entities of system 100 of FIG. 1, with the addition of a feedback path that can feedback some or all of the newly-tagged data 118 into the tagged data 106 some or all of which was previously used as training data. Thus, when updating of the learning component 102 occurs, the retraining can consider portions of the previously-tagged data 106 as well as more recently (or newly) tagged data. The samples for retraining can be selected based on timestamp metadata, for example, or according to other attributes or properties of the tagged data 106. The learning component 102 can be retrained by using a sample of only email messages rather than other document types, for example, and in a specific window of time, and so on. In another embodiment, the tagged data 106 can be processed through an updated learning component 102 to retag the tagged data 106 according to the updated model.

Figure 3:
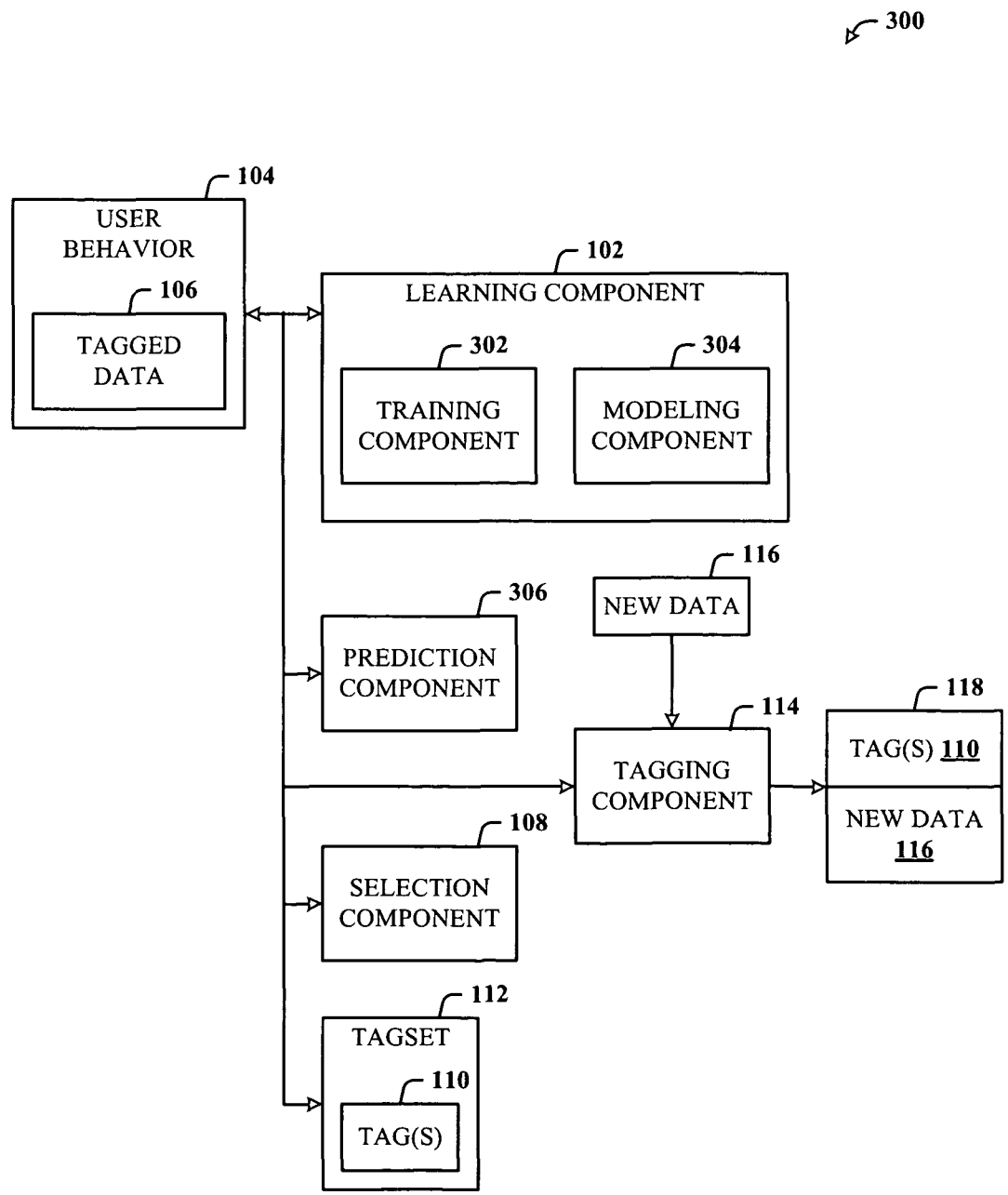
FIG. 3 illustrates a more detailed embodiment of an exemplary learning and tagging system.

FIG. 3 illustrates a more detailed embodiment of an exemplary learning and tagging system 300. Here, the learning component 102 is shown to include a training component 302 and a modeling component 304. The training component 302 can be configured to periodically or regularly perform retraining to adapt to new user tagging behavior. The tagging component 114 can communicate the tag(s) 110 and new data 116 as a tuple to the tagged data 106 which may or may not be selected for inclusion in the next retraining process. It is to be understood that although the tagging can be performed automatically, the user can override the auto-tag with another tag by inspection. No user interaction with the auto-tag can be considered a tacit confirmation that the auto-tag is correct. If a predetermined threshold number of auto-tags are overridden by the user, this can be employed as a trigger for retraining the learning component 102 to improve the auto-tagging on future data.

The modeling component 304 then develops a model for use in predicting the tag(s) 110 to be selected by the selection component 108 for auto-tagging of the new data 116. A prediction component 306 provides the algorithm(s) for predicting one or more tags 110 to be selected for tagging the new data 116.

In other words, one implementation comprises the learning component 102 for learning user behavior related to application of tags to messages by a user, the prediction component 306 for predicting one or more tags for a new message, and the tagging component 114 for automatically tagging the new message with the one or more tags as the new message arrives. The learning component 102 can employ a conjugate gradient regression algorithm to learn the user behavior by separating the messages according to an n-dimension categorization process. The learning component 114 also scopes a user behavior model to a user mailbox such that tag predictions are personalized based on the user mailbox. The learning component 114 trains a user model based on at least one of organizational-tagged data or the user-tagged data 106. Boosting algorithms can also be employed separately or in combination with the conjugate gradient algorithm.

Although illustrated as separate components, the functionality of the selection component 108 can be included as part of the prediction component 306 such that a result of prediction is to select one or more tags for tagging the data (e.g., message). Similarly, the functionality of the prediction component 306 can be included as part of the selection component 108 such that prediction is utilized to determine the selection of one or more tags for tagging the data. Other component blocks can be combined as suitable to provide the desired results.

Figure 4:
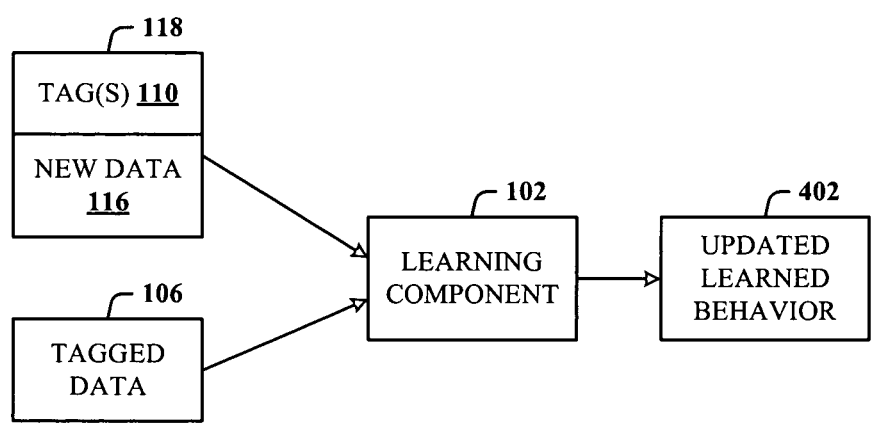
FIG. 4 illustrates a system for updating the learned user behavior.

FIG. 4 illustrates a system 400 for updating the learned user behavior. The learning component 102 can be retrained using some or all of the user-tagged data 106, the newly-tagged data 118 or a portion of the combination of the tagged data 106 and the newly-tagged data 118. The learning component 102 then outputs an updated learned behavior 402 for processing all future data for tagging.

Figure 5:
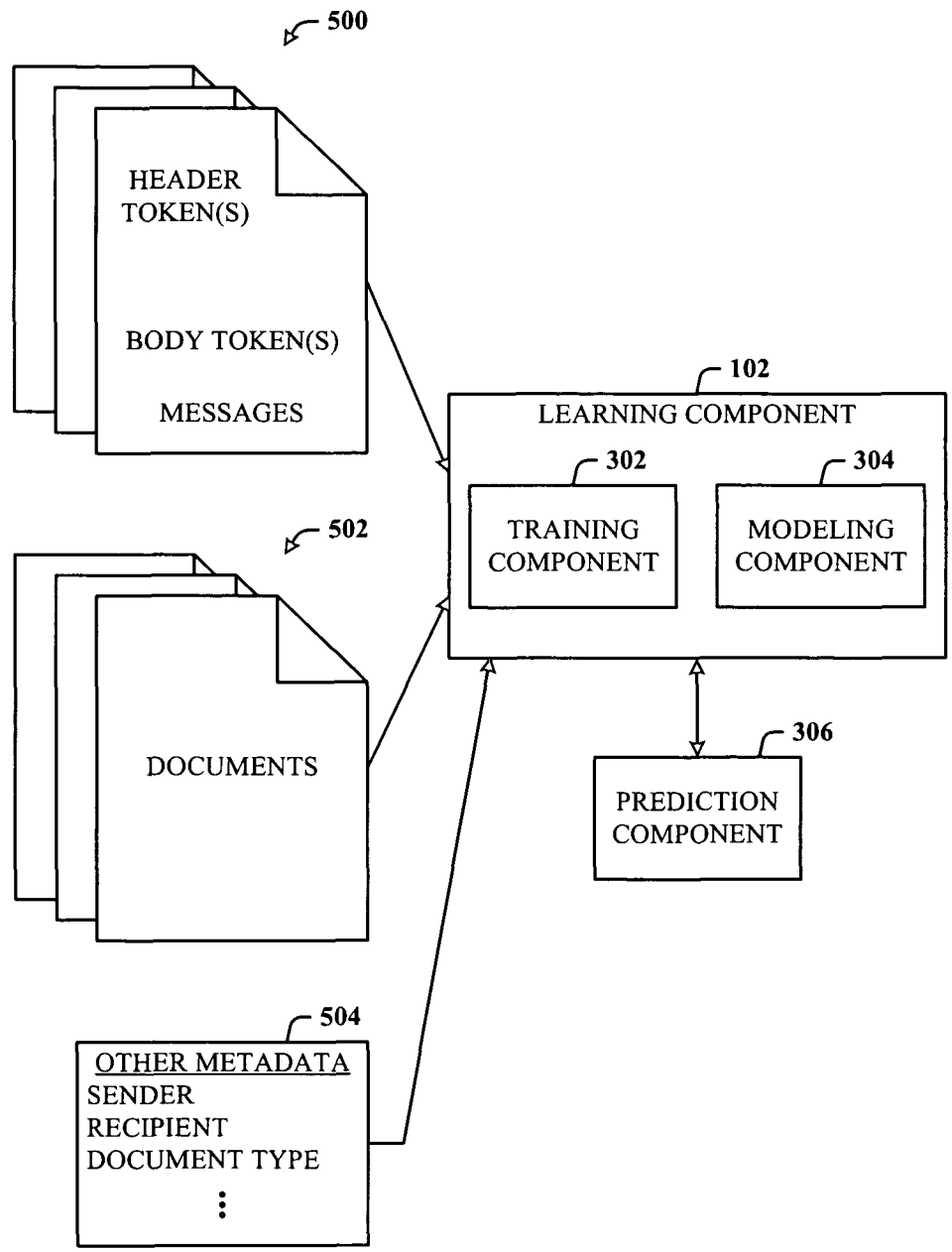
FIG. 5 illustrates types of data attributes or properties that can be employed for model training and tag prediction.

FIG. 5 illustrates types of data attributes or properties that can be employed for model training and tag prediction. For example, messages 500 (e.g., emails, instant messaging text, etc.) can be analyzed and used for learning user tagging behavior. Message header tokens and message body tokens of the messages 500 can be sampled. Alternatively, or in combination therewith, documents 502 generated by the user can be analyzed for terms, phrases, grammar, etc., that can be utilized for learning and predicting tags for new data. Yet again, alternatively or in combination with the messages 500 and/or documents 502, other metadata 504 can be obtained and employed in the learning component 102 for developing and updating the user model. The metadata 504 can include sender information (for messages), recipient information (for messages), document type, timestamp information, content type of the document or message (e.g., financial, project, human resources, personal vacation, etc.), and so on. The amount and type of metadata to be considered, as well as the document types can be configurable. The messages 500, documents 502, and other metadata 504 are employed to enhance the prediction by the prediction component 306 of one or more tags to be selected for tagging a piece of data (previously tagged or new).

Figure 6:
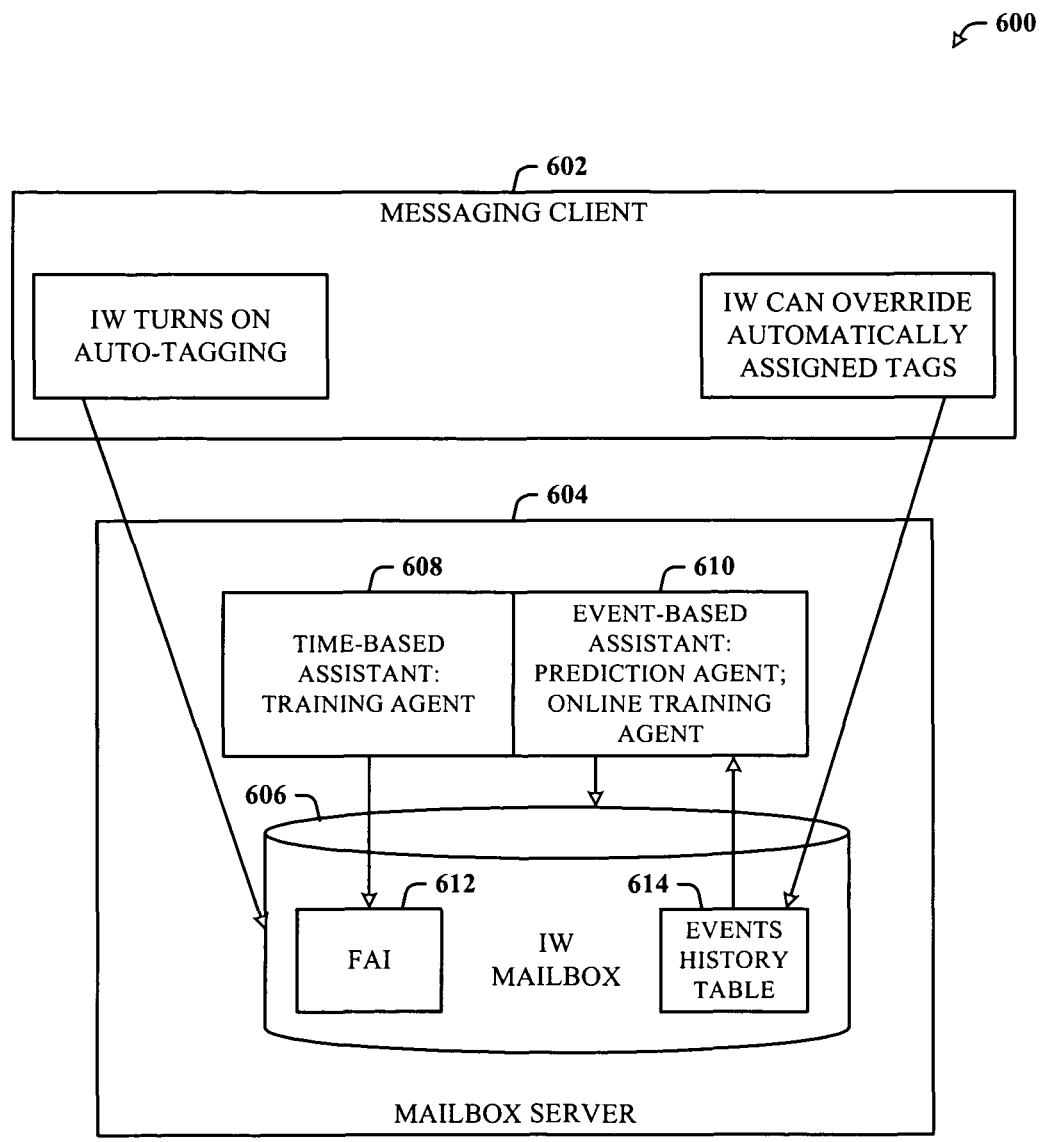
FIG. 6 illustrates a more detailed system for message learning and tagging.

FIG. 6 illustrates a more detailed system 600 for message learning and tagging. The system 600 includes a messaging client 602 communicating with a mailbox server 604. From the client 602, an infoworker (IW) or user can enable auto-tagging at the server 604. This is assigned or associated with the user's mailbox 606. In other words, each user of the mailbox server 604 can enable/disable auto-tagging for the corresponding user mailbox. The mailbox server 604 includes a time-based assistant (TBA) 608 and an event-based assistant (EBA) 610. The TBA 608 is a training agent and the EBA 610 functions as a prediction agent and online training agent for retention policy tag management. The TBA 608 crawls the user mailbox 606 to obtain an initial list of tags used, and then builds a tag-keyword mapping. The EBA 610 then receives incoming messages and tags these messages with the appropriate tag (e.g., retention policy tag).

Folder associated information (FAI) 612, is information that is hidden from the client but associated with the user mailbox 606. Similarly, an events history table 614 is associated with the mailbox 606, and tracks/store events such as the user overriding an auto-tag.

The IW is presented with a user interface (UI) for retention policy tag management. The IW can enable customized defaults for retention policy tags based on a minimum number (e.g., 500) of tagged messages. The user can be presented with selection for one or more retention policies, for example, business general (one year), business projects (three years), product development (ten years), and so on.

As a brief high-level summary, the IW turns on (optionally) the auto-tagging feature in the client UI presented, the TBA 608 learns the IW tagging preferences and automatically retrains the learning model, and the EBA 610 tags the incoming messages appropriately. In one implementation, older messages are not tagged. If a message cannot be tagged with a high degree of confidence, the message is tagged according to the system default policy(ies). It is also to be understood that a system administrator can turn on auto-tagging on behalf of the user. The auto-tagging can become effective after a predetermined number (e.g., 500) of tagged messages in a user's mailbox.

The disclosed auto-tagging architecture is based on machine learning and reasoning (MLR) algorithms. The tag is predicted and applied on the data (e.g., message) as the data comes in; thus, there is no time lag from an end-user perspective, which is beneficial for the end-user experience.

The subject architecture can employ various MLR-based schemes for carrying out various aspects thereof. For example, a process for determining when the learning model will be updated can be facilitated via an automatic classifier system and process.

A classifier is a function that maps an input attribute vector, $x=(x_1, x_2, x_3, x_4, \ldots, x_n$ where n is a positive integer), to a class label class(x). The classifier can also output a confidence that the input belongs to a class, that is, $f(x)=\text{confidence}(\text{class}(x))$. Such classification can employ a probabilistic and/or other statistical analysis (e.g., one factoring into the analysis utilities and costs to maximize the expected value to one or more people) to prognose or infer an action that a user desires to be automatically performed. In the case of data systems, for example, attributes can be words or phrases or other data-specific attributes derived from the words (e.g., database tables, the presence of key terms), and the classes are categories or areas of interest (e.g., levels of priorities).

As used herein, terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

A support vector machine (SVM) is an example of a classifier for MLR that can be employed. The SVM operates by finding a hypersurface in the space of possible inputs that splits the triggering input events from the non-triggering events in an optimal way. Intuitively, this makes the classification correct for testing data that is near, but not identical to training data. Other directed and undirected model classification approaches include, for example, various forms of statistical regression, naïve Bayes, Bayesian networks, decision trees, neural networks, fuzzy logic models, and other statistical classification models representing different patterns of independence can be employed. Classification as used herein also is inclusive of methods used to assign rank and/or priority.

As will be readily appreciated from the subject specification, the subject architecture can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be employed to automatically learn and perform a number of functions according to predetermined criteria.

In one implementation, the learning algorithm(s) (as part of the learning component 102) can be integrated with the TBA 608. When training of the learning algorithm(s) is initiated, this causes each of the tagged messages (tagged data 106) to be broken into tokens. A customized version of a conjugate gradient logistic regression algorithm can be employed for training, that is, to map the tokens to the tag the infoworker had previously applied. This learning phase is persisted in the mailbox in the form of an item of the FAI 612.

As previously described, each incoming message is broken into tokens. The EBA 610 uses the training data to stamp the appropriate retention tag based on the learning. The EBA 610 considers a threshold (or confidence level of the prediction) before stamping the new message with an auto-tag. The threshold can be adjusted at the system level. It is also possible to have the threshold such that it is more conservative when stamping messages that will expire quicker than the standard default policy tag, and less conservative when stamping messages to be retained longer.

It is possible that the predicted retention tags are wrong or that the user-behavior changes over a period of time. The system keeps track of each time the user changes a tag—predicted or not. After a certain threshold is reached (e.g., after the user changes the tag for the 1000th message), an automatic re-learning can be triggered based on the tags the user changed. This automatically improves the quality of auto-tagging over a period of time. It is also possible for the infoworker to request retraining and the system administrator can initiate re-training for auto-tagging on a per-mailbox basis.

Machine learning algorithms benefit from numbers of data items (e.g., emails, messages, etc.). Additionally, the data is mapped to vectors. A true predictive algorithm is n-dimensional, where n is the number of keywords. In one implementation, n=2000, for the top words. In the context of email messages, for example, an email message can be mapped to a vector (numbers) by selecting important words (e.g., by document frequency), and assigning each word a value. With respect to the training algorithm, the TBA 608 crawls the mailbox 606 to obtain an initial list of tags used and builds a tag-keyword mapping.

Consider a 2-dimension or 2-keyword example, selecting only two words [dinner, exchange], where "exchange" is given twice the weighting of "dinner". A first incoming email includes: "Exchange setup log", which maps to a tuple of [0, x2], indicating that the term "dinner" was not present, but the term "exchange" was present with the associated weighting. Similarly, a second incoming email includes: "Have a dinner together", which maps to a tuple of [x1, 0], indicating that the term "dinner" was present with the associated weighting, but the term "exchange" was not present. A third incoming email includes: "A dinner for celebrating exchange", which maps to a tuple of [x1, x2], indicating that the term "dinner" was present with the associated weighting, and the term "exchange" was present with the associated weighting. Accordingly, the mapping of emails to vector can be performed.

Note that although the description continues in the context of a 2-dimension example, the disclosed learning and tagging architecture also applies to an n-dimension application. In other words, the following graph indicates a 2-dimension example of separating the tagged data between personal email and non-personal email. This could further include processing the non-personal email in to other categories of interest, such as project-related or team-related, and so on.

Figure 7:
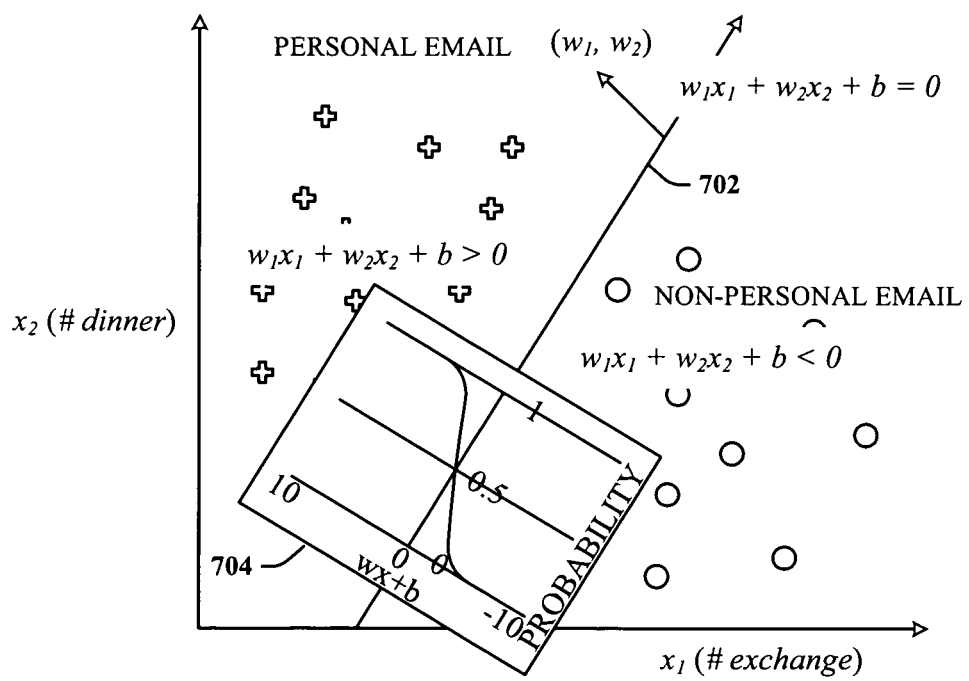
FIG. 7 illustrates a graph that represents results of a training algorithm that separates previously-tagged email messages into categories for learning user tagging behavior.

FIG. 7 illustrates a graph 700 that represents results of a training algorithm that separates previously-tagged email messages into categories for learning user tagging behavior. The training algorithm, employing a linear regression model, seeks to establish an equation $w_1x_1+w_2x_2+b=0$ for a straight line 702 to separate the positive pattern of "Personal Email" from the negative pattern of "Non-Personal Email" based on the keywords of "dinner" and "exchange". If the straight line equation is $w_1x_1+w_2x_2+b>0$, then the message is likely be a "Personal Email".

The linear separator (line 702) is defined by the normal vector $w=[w_1\ w_2]^T$ (where T indicates transposition of the matrix) and the intersection b. Once the separation line 702 is found, the model can be used to predict the category probability 704 for any new email with the following formula, $$P(x \in \text{personal}) = \frac{1}{1+e^{-(w \cdot x+b)}}$$

As shown in the graph 700, a new email that falls on the upper side of the separation (or straight) line 702 is more likely to be a personal email, and if under the separation line 702, the new email is likely not a personal email. If right on the line 702, then the probability is 0.5 that the new email is either personal or non-personal email.

In order to find the separation line (the normal vector w and the intersection b), the training algorithm minimizes the follow equation.

$$f(w,b) = \sum_i y_i \log u_i + (1-y_i)\log(1-u_i)$$

$$u_i = \frac{1}{1+e^{-(w \cdot x_i+b)}}$$

The above equation represents the discrepancy between the predicted probability and the observed probability. By minimizing the above equation, the optimal separation hyperplane that separates the two patterns in a hyperspace can be obtained. In other words, by making the function $f(w,b)$ zero, a perfect prediction can be obtained.

Figure 8:
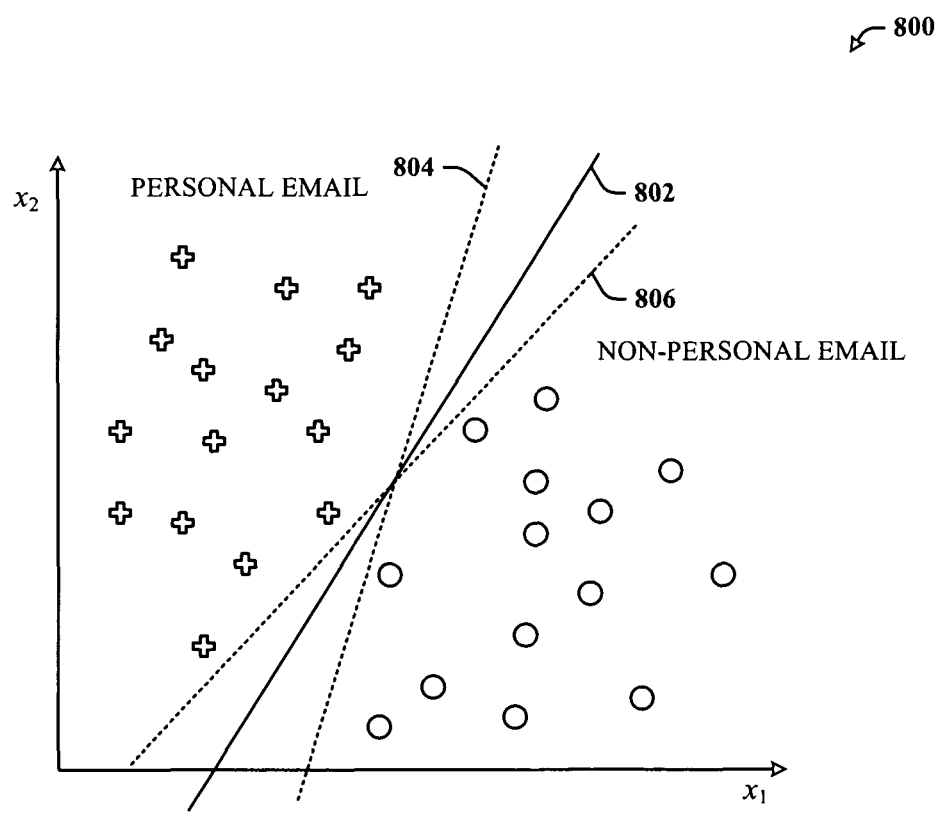
FIG. 8 illustrates a graph that represents use of an exemplary conjugate gradient regression algorithm that can be employed for training and learning.

Alternatively, the optimization process can use a conjugate gradient algorithm to speed up the optimization. FIG. 8 illustrates a graph 800 that represents use of an exemplary conjugate gradient regression algorithm that can be employed for training and learning. In the optimization process, a regularization term is also introduced to achieve models with better generalization ability. For any two categories, optimization is biased toward the solid line 802 by the regularization term. Many separation lines (e.g., line 804 and line 806) can be found. However, the solid line 802 is preferred. By choosing appropriate penalty coefficient ($\alpha$), the process algorithm can avoid over-fitting. The minimized equation is:

$$f(w,b) = \alpha w \cdot w^T + \sum_i y_i \log u_i + (1-y_i)\log(1-u_i)$$

where w and b are internal weights determined by the training algorithm. In the graph 800, x is the incoming email, $u_i$ is the model prediction for the incoming email $x_i$.

The training is an optimization process, which seeks to iteratively find the optimal model parameters based on the pattern learned from the training e-mails. In each iteration the algorithm combines the current gradient information and the oscillated history gradient (conjugate gradient) information to evolve the model parameters. The approach ensures the reliability and speed of the training process. Note that this model is a generic model that can be potentially used for other forms of document classification.

Figure 9:
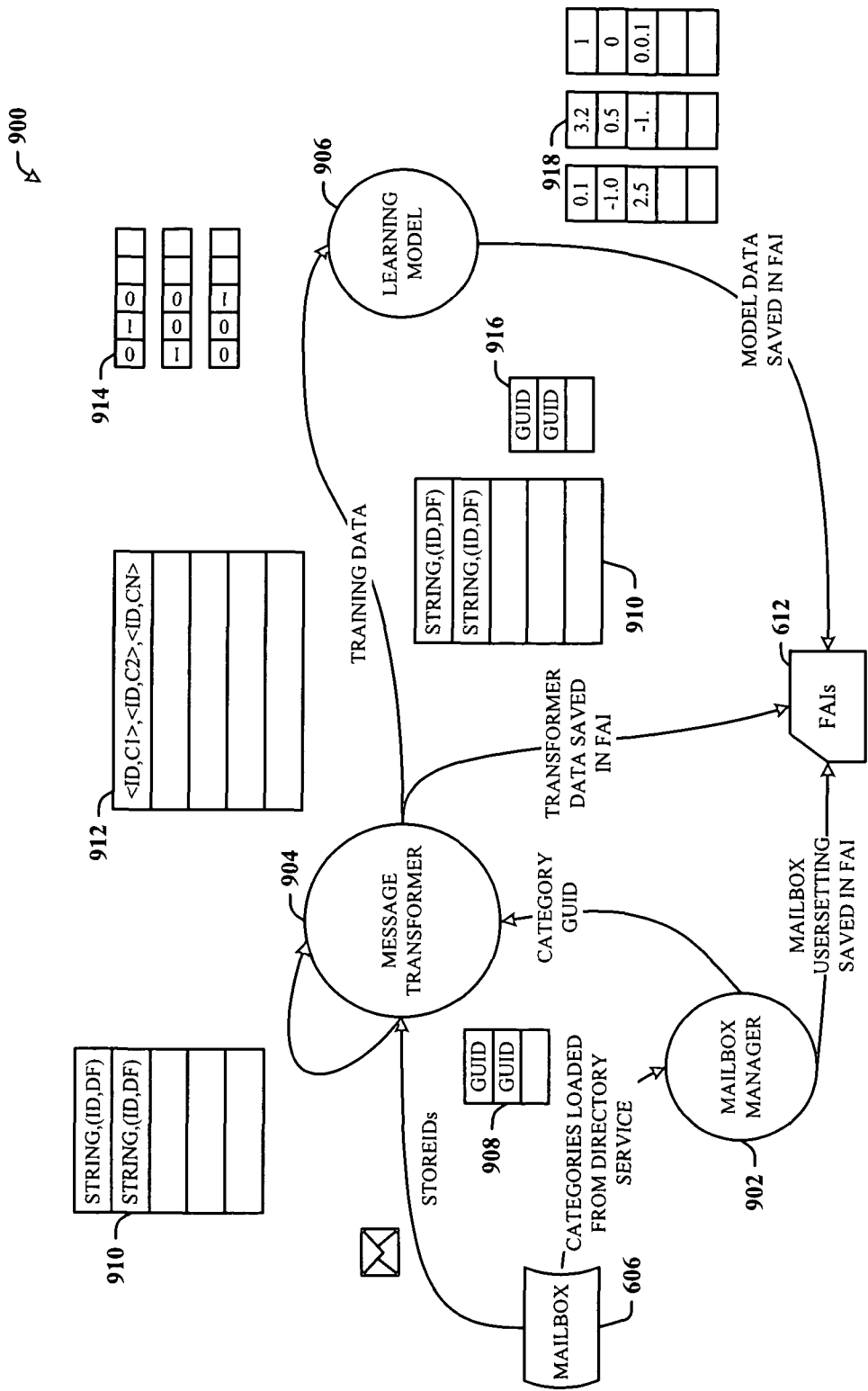
FIG. 9 illustrates an exemplary batch training workflow diagram.

FIG. 9 illustrates an exemplary batch training workflow diagram 900. The diagram 900 shows the data flow of the batch training process. Batch training can be issued either by the time-based assistant or by a training task. The batch training deletes the existing model and creates a new model. As shown, in one implementation, the training process is coordinated by three components: a mailbox manager 902, a message transformer 904, and a learning model 906. The mailbox manager 902 is responsible for loading the existing categories (tags) from the current mailbox (e.g., batch training can be configured to occur only with a minimum of 500 tagged mails). These tags are the outputs of the learning model 906. A tag GUID array 908 is delivered from the mailbox manager 902 to the message transformer 904 so that the transformer 904 can generate the email category vectors (identifying if an email belongs to a category or not).

The message transformer 904 is responsible for transform email text to numerical values that the learning model 906 can understand. The message transformer 904 loads each user-tagged email from the mailbox 606, breaks the text and convert the text into a two dimensional data table. Each row of the table is an email and each column is a numerical value assigned to a word in the email. For performance reasons, the rows in the two dimensional table can be a sparse array. The message transformer 904 also produces a map 910 that can be used to lookup document frequencies (df) and column indexes.

The map 910 and tag GUID array 908 are fed to the learning model 906. The learning model 906 encapsulates the learning algorithm that establishes a model based on the training data. The trained learning model 906, the transformer 904 (the word lookup map to retrieve the index and the document frequencies), and the tag GUID array 908 are finally saved in FAI messages 612 in the mailbox 606.

The table 912 includes sparse vector rows where each email is transformed into a sparse vector row <ID,C>[ ]. The top m words (e.g., m=2000) in a document frequency list are chosen to compose a training table. Category vectors 914 indicate if an email belongs to a category. A tag array 916 maps the ID to the tag GUID. At 918, each category generates a (2001) vector for w1 . . . w2000, and B.

In one embodiment, there are three FAI messages 612 that can be employed for auto-tagging. An AutoTag.Model FAI saves the model and the transformer data, an AutoTag.Setting FAI saves the user setting and the model status, and an AutoTag.Tuning FAI saves the tuning parameters that will be used for the tuning purpose. Information in AutoTag.Setting FAI can be used to populate the mailbox manager 902 and information in AutoTag.Tuning can be used to override the default parameter in the learning model 906. The information of the AutoTag.Model and AutoTag.Setting FAI messages can be cached in the event-based assistant per mailbox.

Figure 10:
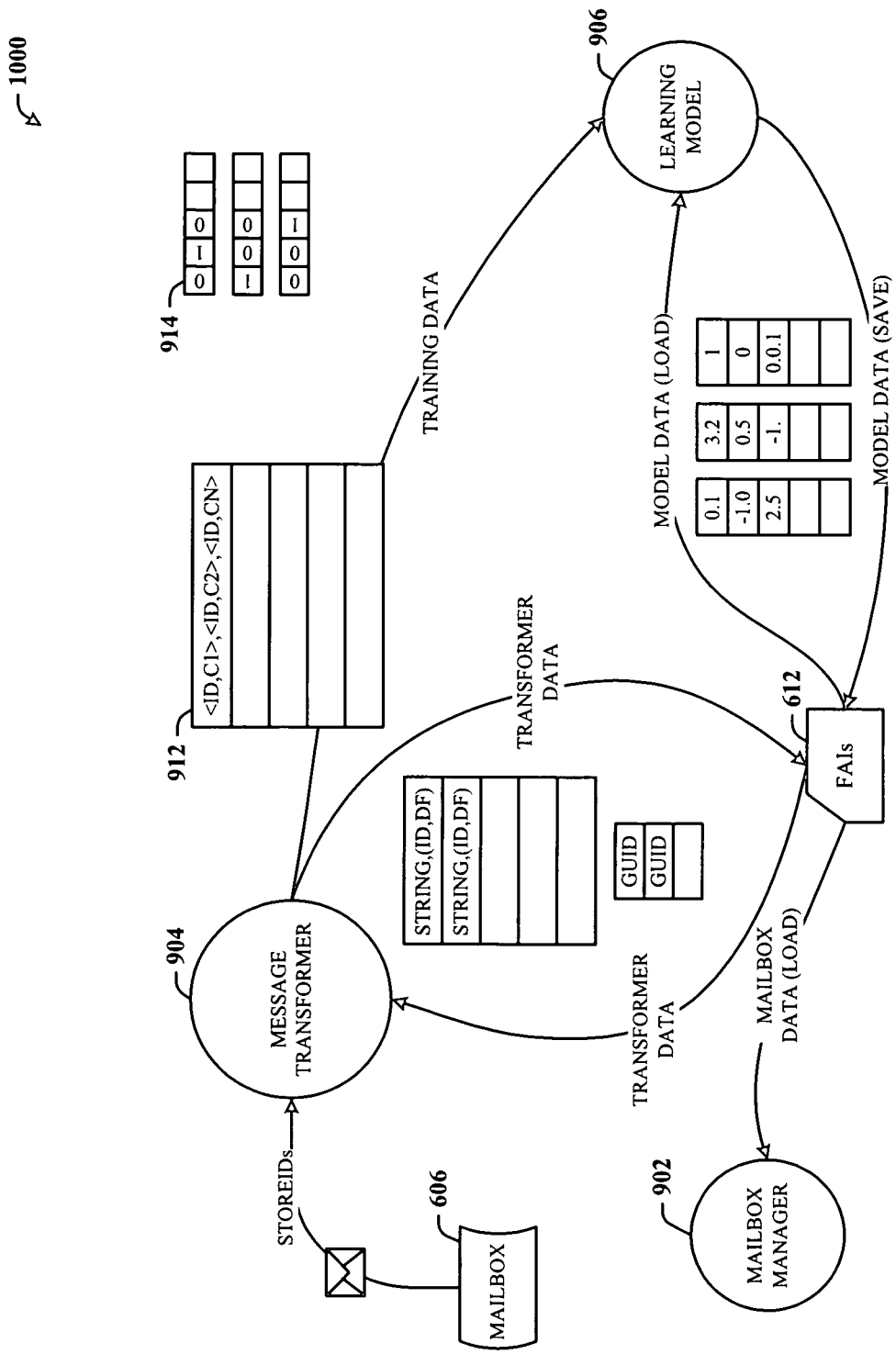
FIG. 10 illustrates an exemplary online training workflow diagram.

FIG. 10 illustrates an exemplary online training workflow diagram 1000. The online training process is similar to batch training but it is much simpler. Online training is issued by the event-based assistant when a user finds that an email was tagged to a wrong category and the user performs the correction. Online training evolves the current model slowly so that the current model is less likely to make the same mistake in the future.

Since online training evolves the current model, the model data and transform data are first loaded from the FAI messages 612 as shown in the data flow. When online training occurs, the message transformer 904 converts the corrected email to the appropriate model inputs. Then the learning model 906 updates the model state accordingly. The updated model is eventually saved back to the FAI messages 612.

Figure 11:
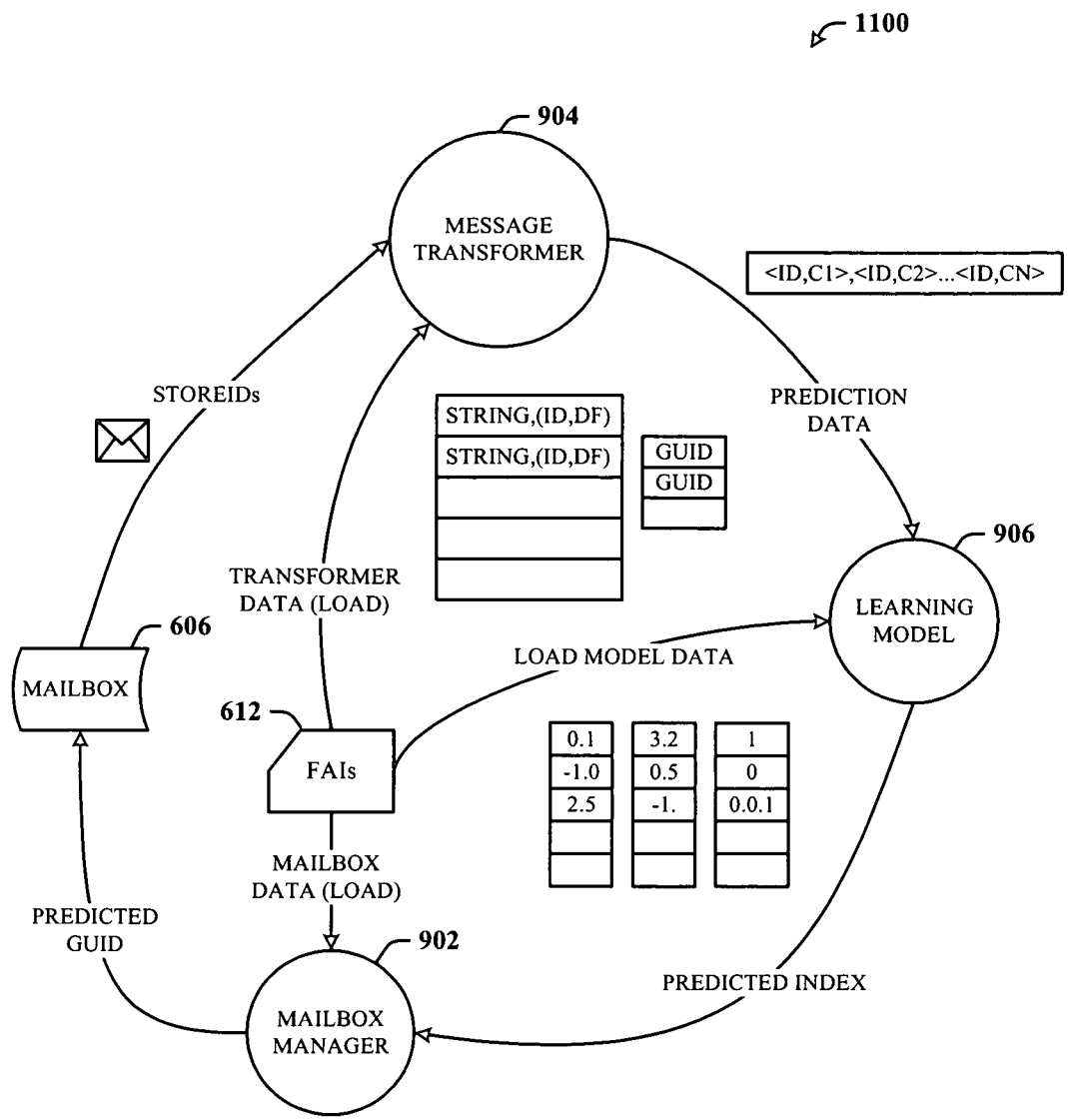
FIG. 11 illustrates a data flow diagram for model prediction.

FIG. 11 illustrates a data flow diagram 1100 for model prediction. In the prediction process, the message transformer 904 and learning model 906 load the model data from FAI messages 612. For an incoming email that has the default tag, the message transformer 904 converts the email into the appropriate model inputs and the learning model 906 predicts the tag index. The mailbox manager 902 stamps the tag GUID and saves the message in the mailbox 606.

Figure 12:
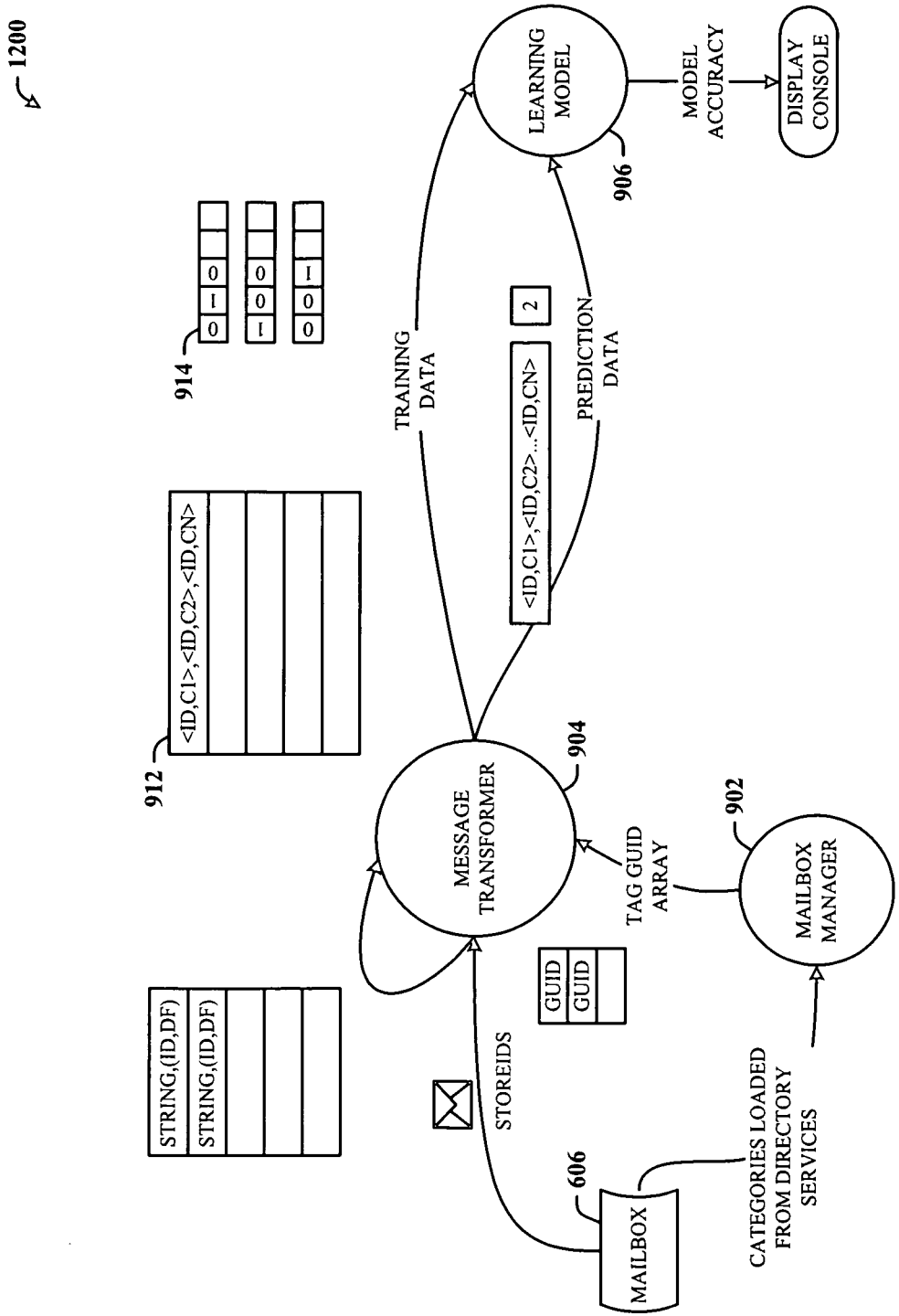
FIG. 12 illustrates a data flow diagram for model cross validation.

FIG. 12 illustrates a data flow diagram 1200 for model cross validation. Cross-validation is a diagnostic process from which customers can learn the model prediction accuracy. During the cross-validation process, the available tagged mails are partitioned into a training set and a testing set by the cross validation manager (not shown). Then the batch training process is used to create a model and the model is tested on the testing set to compute the prediction accuracy.

Figure 13:
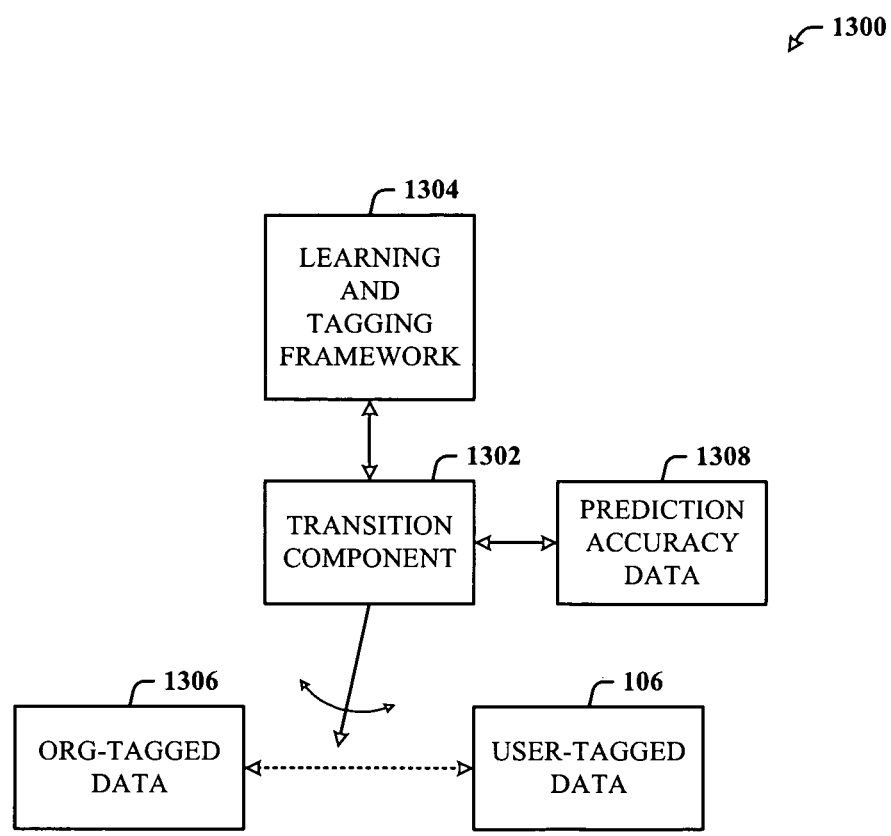
FIG. 13 illustrates a system that employs a transitional training process.

FIG. 13 illustrates a system 1300 that employs a transitional training process. It can be the case where the amount of user-tagged data 106 has not reached the threshold number desired for training the learning model. In this instance, a transition component 1302 can be employed in cooperation with a learning and tagging framework 1304. The transition component 1302 monitors the number of user-tagged data 106, and until such time as the number reaches the training threshold, accessed organizational-tagged data 1306 for training the user model. The organizational-tagged data 1306 will have a sufficient number of other user-tagged data and enterprise-tagged data (e.g., administrator or auto-tagged) from which to obtain a sample for training the user learning model. This also includes re-training the user behavior as the organizational-tagged data 1306 changes. When the number of user-tagged data 106 reaches the minimum threshold, the transition component 1302 switches to the user-tagged data 106 for obtaining samples and training the user model.

The system 1300 can also compute and employ prediction accuracy data 1308 that defines the quality of the tagged data (user-tagged, enterprise-tagged) used for sampling and training the user model. If the accuracy data 1308 is a value hat indicates the predication accuracy is in sufficient, this can trigger a re-training process, using the organizational-tagged data 1306, the user tagged data 106, or a combination of the organizational-tagged data 1306 and the user tagged data 106. The learning and tagging framework 1304 can include the systems and functionality described herein in association with other figures.

Following is a series of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 14:
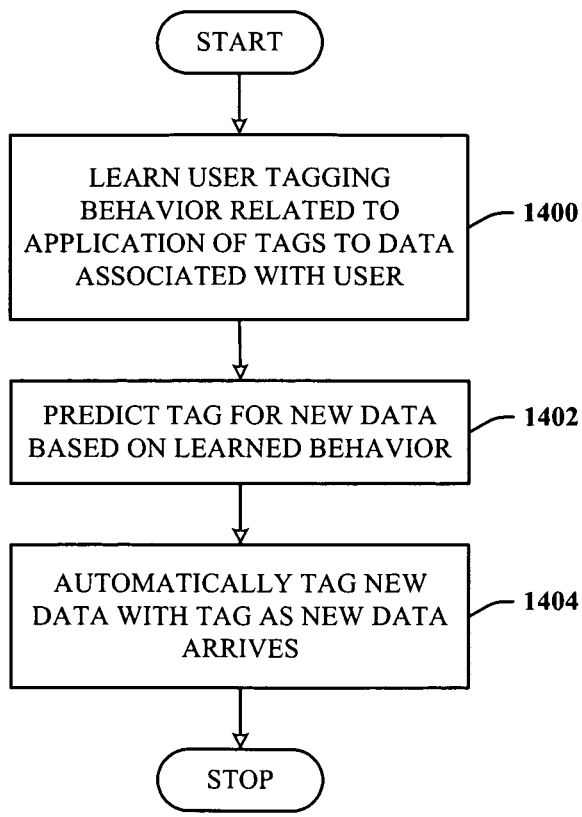
FIG. 14 illustrates a computer-implemented method of tagging data.

FIG. 14 illustrates a computer-implemented method of tagging data. At 1400, user tagging behavior related to application of tags to data associated with a user is learned. At 1402, a tag is predicted for a new data based on the learned user behavior. At 1404, the new data is automatically tagged with the tag as the new data arrives. The basic workflow of the auto-tagging architecture for email messages can be the following. The user tags the existing mails, a learning model reads the tagged email and trains the model, and the model predicts tags for incoming emails.

The user tagging behavior is learned using a form of a conjugate gradient logistic regression algorithm that categorizes the data and facilitates selection of the tag predicted for tagging the data, which is an email message. The method can further comprise automatically re-learning the user behavior based on reduced prediction accuracy in predicting the tag for tagging the new data. The method can further comprise generating tokens from the data, which data is personal to the user, and mapping the tokens to a tag the user has applied, to train a user behavior model. Additionally, the method can further comprise retraining a user model over time to improve accuracy in predicting the tag based on changes in user tagging behavior, and retagging previously-tagged data based on a change in the user tagging behavior.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 15:
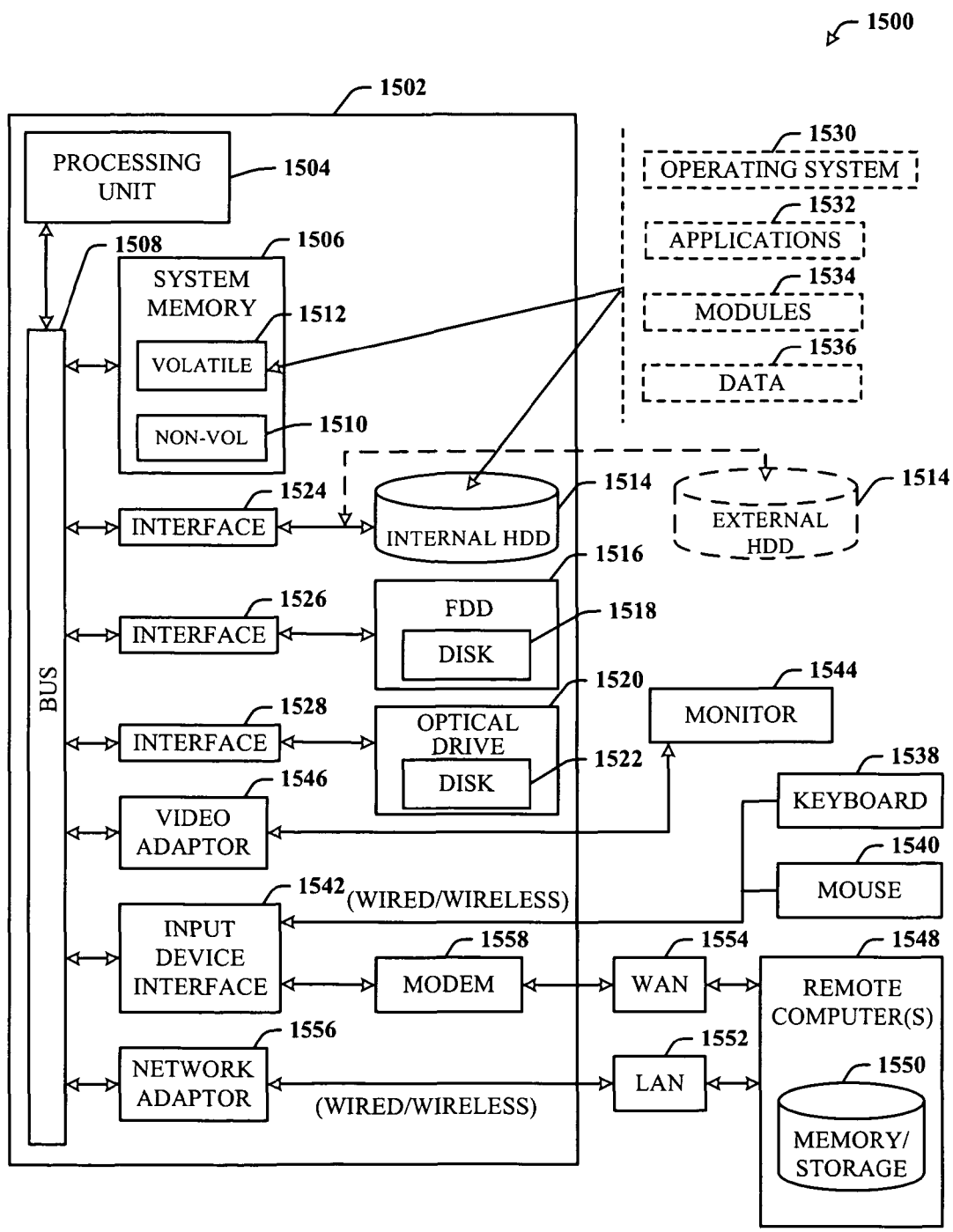
FIG. 15 illustrates a block diagram of a computing system operable to execute learning and tagging in accordance with the disclosed architecture.

Referring now to FIG. 15, there is illustrated a block diagram of a computing system 1500 operable to execute learning and tagging in accordance with the disclosed architecture. In order to provide additional context for various aspects thereof, FIG. 15 and the following discussion are intended to provide a brief, general description of a suitable computing system 1500 in which the various aspects can be implemented. While the description above is in the general context of computer-executable instructions that may run on one or more computers, those skilled in the art will recognize that a novel embodiment also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes volatile and non-volatile media, removable and non-removable media. By way of example, and not limitation, computer-readable media can comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 15, the exemplary computing system 1500 for implementing various aspects includes a computer 1502 having a processing unit 1504, a system memory 1506 and a system bus 1508. The system bus 1508 provides an interface for system components including, but not limited to, the system memory 1506 to the processing unit 1504. The processing unit 1504 can be any of various commercially available processors. Dual microprocessors and other multi-processor architectures may also be employed as the processing unit 1504.

The system bus 1508 can be any of several types of bus structure that may further interconnect to a memory bus (with or without a memory controller), a peripheral bus, and a local bus using any of a variety of commercially available bus architectures. The system memory 1506 can include non-volatile memory (NON-VOL) 1510 and/or volatile memory 1512 (e.g., random access memory (RAM)). A basic input/output system (BIOS) can be stored in the non-volatile memory 1510 (e.g., ROM, EPROM, EEPROM, etc.), which BIOS are the basic routines that help to transfer information between elements within the computer 1502, such as during start-up. The volatile memory 1512 can also include a high-speed RAM such as static RAM for caching data.

The computer 1502 further includes an internal hard disk drive (HDD) 1514 (e.g., EIDE, SATA), which internal HDD 1514 may also be configured for external use in a suitable chassis, a magnetic floppy disk drive (FDD) 1516, (e.g., to read from or write to a removable diskette 1518) and an optical disk drive 1520, (e.g., reading a CD-ROM disk 1522 or, to read from or write to other high capacity optical media such as a DVD). The HDD 1514, FDD 1516 and optical disk drive 1520 can be connected to the system bus 1508 by a HDD interface 1524, an FDD interface 1526 and an optical drive interface 1528, respectively. The HDD interface 1524 for external drive implementations can include at least one or both of Universal Serial Bus (USB) and IEEE 1394 interface technologies.

The drives and associated computer-readable media provide nonvolatile storage of data, data structures, computer-executable instructions, and so forth. For the computer 1502, the drives and media accommodate the storage of any data in a suitable digital format. Although the description of computer-readable media above refers to a HDD, a removable magnetic diskette (e.g., FDD), and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing novel methods of the disclosed architecture.

A number of program modules can be stored in the drives and volatile memory 1512, including an operating system 1530, one or more application programs 1532, other program modules 1534, and program data 1536. Where the computer 1502 is employed as a server system, the one or more application programs 1532, other program modules 1534, and program data 1536 can include the system 100, system 200, system 300, system 400, the functionality represented in FIG. 5, the mailbox server 604, and other methods and data flows as described herein.

All or portions of the operating system, applications, modules, and/or data can also be cached in the volatile memory 1512. It is to be appreciated that the disclosed architecture can be implemented with various commercially available operating systems or combinations of operating systems.

A user can enter commands and information into the computer 1502 through one or more wire/wireless input devices, for example, a keyboard 1538 and a pointing device, such as a mouse 1540. Other input devices (not shown) may include a microphone, an IR remote control, a joystick, a game pad, a stylus pen, touch screen, or the like. These and other input devices are often connected to the processing unit 1504 through an input device interface 1542 that is coupled to the system bus 1508, but can be connected by other interfaces such as a parallel port, IEEE 1394 serial port, a game port, a USB port, an IR interface, etc.

A monitor 1544 or other type of display device is also connected to the system bus 1508 via an interface, such as a video adaptor 1546. In addition to the monitor 1544, a computer typically includes other peripheral output devices (not shown), such as speakers, printers, etc.

The computer 1502 may operate in a networked environment using logical connections via wire and/or wireless communications to one or more remote computers, such as a remote computer(s) 1548. The remote computer(s) 1548 can be a workstation, a server computer, a router, a personal computer, portable computer, microprocessor-based entertainment appliance, a peer device or other common network node, and typically includes many or all of the elements described relative to the computer 1502, although, for purposes of brevity, only a memory/storage device 1550 is illustrated. The logical connections depicted include wire/wireless connectivity to a local area network (LAN) 1552 and/or larger networks, for example, a wide area network (WAN) 1554. Such LAN and WAN networking environments are commonplace in offices and companies, and facilitate enterprise-wide computer networks, such as intranets, all of which may connect to a global communications network, for example, the Internet.

When used in a LAN networking environment, the computer 1502 is connected to the LAN 1552 through a wire and/or wireless communication network interface or adaptor 1556. The adaptor 1556 can facilitate wire and/or wireless communications to the LAN 1552, which may also include a wireless access point disposed thereon for communicating with the wireless functionality of the adaptor 1556.

When used in a WAN networking environment, the computer 1502 can include a modem 1558, or is connected to a communications server on the WAN 1554, or has other means for establishing communications over the WAN 1554, such as by way of the Internet. The modem 1558, which can be internal or external and a wire and/or wireless device, is connected to the system bus 1508 via the input device interface 1542. In a networked environment, program modules depicted relative to the computer 1502, or portions thereof, can be stored in the remote memory/storage device 1550. It will be appreciated that the network connections shown are exemplary and other means of establishing a communications link between the computers can be used.

The computer 1502 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

Figure 16:
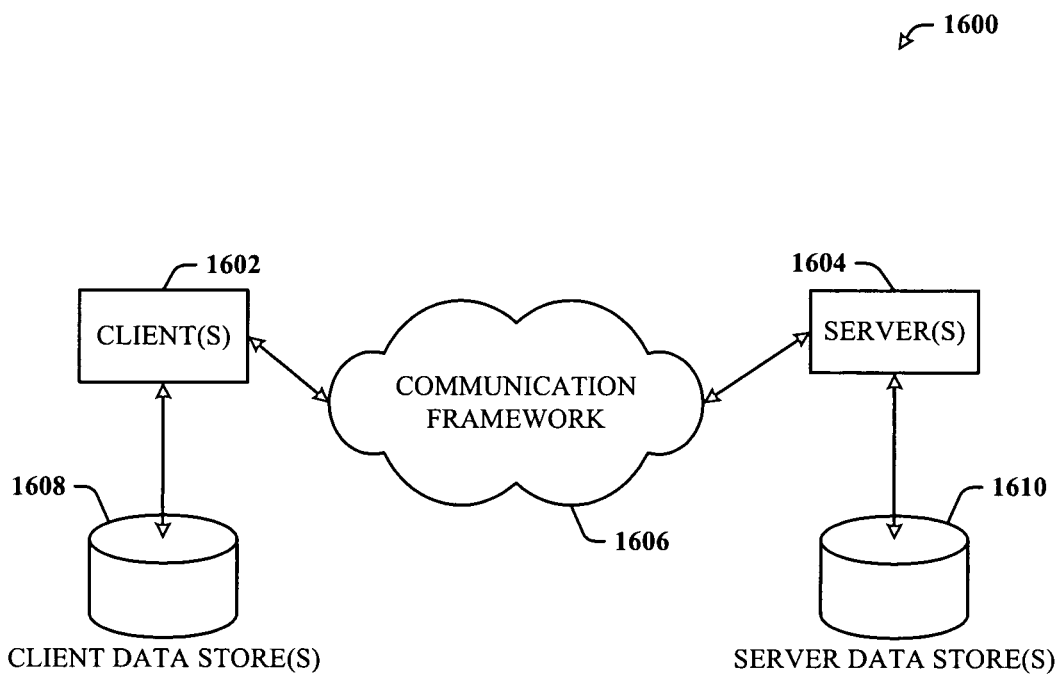
FIG. 16 illustrates a schematic block diagram of an exemplary computing environment that facilitates user behavior learning and tagging of data.

Referring now to FIG. 16, there is illustrated a schematic block diagram of an exemplary computing environment 1600 that facilitates user behavior learning and tagging of data. The environment 1600 includes one or more client(s) 1602. The client(s) 1602 can be hardware and/or software (e.g., threads, processes, computing devices). The client(s) 1602 can house cookie(s) and/or associated contextual information, for example.

The environment 1600 also includes one or more server(s) 1604. The server(s) 1604 can also be hardware and/or software (e.g., threads, processes, computing devices). The servers 1604 can house threads to perform transformations by employing the architecture, for example. One possible communication between a client 1602 and a server 1604 can be in the form of a data packet adapted to be transmitted between two or more computer processes. The data packet may include a cookie and/or associated contextual information, for example. The environment 1600 includes a communication framework 1606 (e.g., a global communication network such as the Internet) that can be employed to facilitate communications between the client(s) 1602 and the server(s) 1604.

Communications can be facilitated via a wire (including optical fiber) and/or wireless technology. The client(s) 1602 are operatively connected to one or more client data store(s) 1608 that can be employed to store information local to the client(s) 1602 (e.g., cookie(s) and/or associated contextual information). Similarly, the server(s) 1604 are operatively connected to one or more server data store(s) 1610 that can be employed to store information local to the servers 1604.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented tagging system, comprising:
   a learning component for learning user tagging behavior related to tagged data by analyzing an application of tags to messages by a user, wherein the learning component generates tokens from the tagged data, maps the tokens to a tag the user has applied and employs a conjugate gradient regression algorithm to learn the user tagging behavior by separating the tagged data according to an n-dimensional categorization process;
   a selection component for automatically predicting and selecting one or more tags from a tagset based on prior tagging habits of the user, as indicated by the learned user tagging behavior;

a tagging component for automatically tagging new data entering the system by automatically applying the one or more tags based on the prior tagging habits, indicated by the learned user tagging behavior, to enable auto-tagging for reducing a tagging burden of the user, wherein the automatically applied tag may be overridden by the user;

a feedback path for feeding back at least a portion of the tagged new data into the tagged data, at least a portion of which was previously used as training data, to perform retraining of the learning component to adapt to new user tagging behavior, wherein the retraining is performed periodically or in response to a predetermined threshold number of automatically applied tags being overridden by the user; and a processor that executes computer-executable instructions associated with at least one of the learning component, the selection component, or the tagging component.

2. The system of claim 1, wherein the data is an incoming message.

3. The system of claim 1, further comprising a prediction component for predicting that the new data is to be tagged.

4. The system of claim 3, wherein the learning component dynamically learns updated user behavior based on accuracy of the new data predicted for tagging and re-tags the tagged data based on the updated user behavior.

5. The system of claim 1, further comprising a modeling component for generating a model of the user tagging behavior based on a personalized resource of a user system.

6. The system of claim 1, wherein the user tagging behavior is learned based on attributes of the data and the new data.

7. The system of claim 6, wherein the attributes are obtained from data that includes messages, the attributes include at least one of a token from a body of the message, a token from a header of the message, information of a sender of the message, or information of a recipient of the message.

8. The system of claim 1, wherein the new data is tagged as the new data arrives at a user system.

9. The system of claim 1, further comprising a training component for crawling the data and separating the data into categories.

10. A computer-implemented tagging system, comprising:
a learning component for learning user tagging behavior by analyzing an application of tags to messages by a user, wherein the learning component generates tokens from the tagged data, maps the tokens to a tag the user has applied and employs a conjugate gradient regression algorithm to learn the user tagging behavior by separating the tagged data according to an n-dimensional categorization process;

a prediction component for automatically predicting and selecting one or more tags from a tagset for a new message entering the system based on prior message tagging habits of the user, as indicated by the learned user tagging behavior;

a tagging component for automatically tagging the new message by automatically applying the one or more tags as the new message arrives, wherein the automatically applied tag may be overridden by the user;

a feedback path for feeding back at least a portion of the one or more tags for the new message into the user tagging behavior learned by the user component, so that the learning component is updated by retraining to consider portions of previously-tagged data and newly tagged data that indicate new tagging behavior of the user, wherein the retraining is performed periodically or in response to a predetermined threshold number of automatically applied tags being overridden by the user;

a processor that executes computer-executable instructions associated with at least one of the learning component, the prediction component, the tagging component, or the feedback path.

11. The system of claim 10, wherein the learning component further employs a boosting algorithm to learn the user tagging behavior.

12. The system of claim 10, wherein the learning component scopes a user behavior model to a user mailbox such that tag predictions are personalized based on the user mailbox.

13. The system of claim 10, wherein the learning component trains a user model based on at least one of organizational-tagged data or user-tagged data.

14. The system of claim 10, wherein the one or more tags are retention tags employed in accordance with compliance requirements.

15. A computer-implemented method of tagging data, comprising the acts of:
learning user tagging behavior by analyzing an application of tags to data associated with a user, wherein learning comprises generating tokens from the tagged data, mapping the tokens to a tag the user has applied and employment of a conjugate gradient regression algorithm to learn the user tagging behavior by separating the tagged data according to an n-dimensional categorization process;

predicting a tag for new data based on the learned user behavior and automatically selecting the predicted tag from a tagset;

automatically tagging the new data by automatically applying the tag as the new data arrives based on prior tagging habits of the user, as indicated by the learned user tagging behavior, wherein the automatically applied tag may be overridden by the user;

feeding back at least a portion of the tagged new data into the user tagging behavior;

updating the user tagging behavior by retraining a user model to consider portions of previously-tagged data and tagged new data, to adapt to new tagging behavior associated with the user, wherein the retraining is performed periodically or in response to a predetermined threshold number of automatically applied tags being overridden by the user; and utilizing a processor to execute instructions stored in memory to perform at least one of the acts of learning, predicting, automatically tagging, feeding back, or updating.

16. The method of claim 15, wherein the user tagging behavior is learned through the additional use of a boosting algorithm that categorizes the data and facilitates selection of the tag predicted for tagging the data, which data is an email message.

17. The method of claim 15, further comprising automatically re-learning the user behavior based on reduced prediction accuracy in predicting the tag for tagging the new data.

18. The method of claim 15, further comprising retraining the user model over time to improve accuracy in predicting the tag based on changes in user tagging behavior.

19. The method of claim 15, further comprising retagging previously-tagged data based on a change in the user tagging behavior.

* * * * *